(12) United States Patent
Yamazaki et al.

(10) Patent No.: US 9,701,812 B2
(45) Date of Patent: Jul. 11, 2017

(54) CLARIFYING AGENT COMPOSITION, AND POLYOLEFIN RESIN COMPOSITION CONTAINING SAME

(71) Applicant: ADEKA CORPORATION, Tokyo (JP)

(72) Inventors: Kenji Yamazaki, Saitama (JP); Naoko Tanji, Saitama (JP); Toshinori Yukino, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/894,274

(22) PCT Filed: May 28, 2014

(86) PCT No.: PCT/JP2014/064137
§ 371 (c)(1),
(2) Date: Nov. 25, 2015

(87) PCT Pub. No.: WO2014/192812
PCT Pub. Date: Dec. 4, 2014

(65) Prior Publication Data
US 2016/0115295 A1   Apr. 28, 2016

(30) Foreign Application Priority Data

May 31, 2013  (JP) ................. 2013-115465

(51) Int. Cl.
| | | |
|---|---|---|
| *C08L 23/12* | (2006.01) | |
| *C08K 5/053* | (2006.01) | |
| *C08K 5/1575* | (2006.01) | |
| *C08K 5/06* | (2006.01) | |
| *C08K 5/103* | (2006.01) | |
| *C08K 5/101* | (2006.01) | |
| *C08K 5/138* | (2006.01) | |

(52) U.S. Cl.
CPC ............ *C08K 5/1575* (2013.01); *C08K 5/06* (2013.01); *C08K 5/101* (2013.01); *C08K 5/103* (2013.01); *C08K 5/053* (2013.01); *C08K 5/138* (2013.01); *C08L 23/12* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 5,198,484 A | 3/1993 | Mannion | |
| 6,417,254 B1 * | 7/2002 | Kobayashi | C08K 5/1575 524/108 |
| 7,662,978 B2 * | 2/2010 | Xie | C07D 493/04 524/108 |
| 9,441,091 B2 * | 9/2016 | Haruna | C08L 23/10 |
| 2007/0185247 A1 | 8/2007 | Danielson et al. | |
| 2010/0093899 A1 | 4/2010 | Saitou et al. | |
| 2010/0204374 A1 * | 8/2010 | Tanji | C08J 3/226 524/117 |
| 2011/0105657 A1 | 5/2011 | Tanji et al. | |
| 2012/0296018 A1 | 11/2012 | Haruna et al. | |
| 2014/0128520 A1 | 5/2014 | Haruna et al. | |

FOREIGN PATENT DOCUMENTS

| | | |
|---|---|---|
| CN | 101080465 A | 11/2007 |
| CN | 102027060 A | 4/2011 |
| CN | 102725348 A | 10/2012 |
| CN | 103554650 A | 2/2014 |
| EP | 1826241 A1 | 8/2007 |
| JP | 6-145431 A | 5/1994 |
| JP | 2002-332359 A | 11/2002 |
| JP | 2003-96246 A | 4/2003 |
| JP | 2008-189822 A | 8/2008 |
| JP | 2009-507982 A | 2/2009 |

(Continued)

OTHER PUBLICATIONS

Chinese Office Action and Search Report issued Oct. 20, 2016 in Chinese Application No. 201480031107.0, together with an English translation thereof.
Tiehong (chief editor), "Chinese Medicine Pharmacy Char(39).," The Chinese Traditional Medicine Publishing House, May 2006, p. 273 (3 pages total).
International Search Report, issued in PCT/JP2014/064137, dated Jun. 24, 2014.

*Primary Examiner* — Richard A Huhn
(74) *Attorney, Agent, or Firm* — Birch, Stewart, Kolasch & Birch, LLP

(57) ABSTRACT

Provided are: a clarifying agent composition in a powder form which has excellent fluidity; and a polyolefin-based resin composition capable of yielding a molded article having excellent clarity. The clarifying agent composition is obtained by heating a mixture in a range of 80 to 180° C., the mixture comprising: not less than 85% by mass of a benzylidene sorbitol compound represented by the following Formula (1):

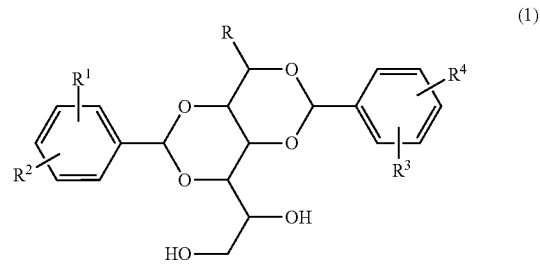

(1)

(wherein, R represents a hydrogen atom or an alkyl group having 1 to 4 carbon atoms; and $R^1$, $R^2$, $R^3$ and $R^4$ each independently represent a hydrogen atom, a halogen atom, a cyano group or an alkyl group having 1 to 4 carbon atoms);
5 to 10% by mass of tetrakis[3(3,5-di-tert-butyl-4-hydroxyphenyl)propionyloxymethyl]methane; and 6 to 9% by mass of a lubricant.

7 Claims, No Drawings

(56) References Cited

FOREIGN PATENT DOCUMENTS

| JP | 2009-526123 A | 7/2009 |
|---|---|---|
| JP | 2010-84095 A | 4/2010 |
| JP | 2011-207991 A | 10/2011 |
| WO | WO 2007/032797 A1 | 3/2007 |
| WO | WO 2008/096649 A1 | 8/2008 |

* cited by examiner

CLARIFYING AGENT COMPOSITION, AND POLYOLEFIN RESIN COMPOSITION CONTAINING SAME

TECHNICAL FIELD

The present invention relates to a clarifying agent composition and a polyolefin-based resin composition comprising the same. More particularly, the present invention relates to: a clarifying agent composition in a powder form which has excellent fluidity and is capable of yielding a polyolefin-based resin composition having excellent clarity; and a polyolefin-based resin composition comprising the same.

BACKGROUND ART

Benzylidene sorbitol compounds that are used as a clarifying agent for improving the clarity of a polyolefin-based resin have a high melting point and a low solubility to solvents; therefore, during chemical synthesis, precipitation of crystals occurs simultaneously with the reaction. These crystals are highly cohesive whisker-form crystals and, since powder thereof obtained through a pulverization process has a low bulk specific gravity and is compressible, the power has poor fluidity and automatic measurement thereof is difficult.

One example of a method of supplying an additive to a polyolefin-based resin is a method of feeding an additive from a hopper to a processing machine, such as an extruder, to which a polyolefin-based resin has been loaded; however, when a benzylidene sorbitol compound is fed from a hopper, the compound may induce blocking in the hopper, resulting in defective loading.

Further, a clarifying agent requires to be uniformly dispersed for expression of its function; therefore, in many cases, the clarifying agent is added to a processing machine in the form of master powder prepared in advance by blending the clarifying agent with a certain amount of a polyolefin-based resin. A clarifying agent having a low bulk specific gravity causes layer separation during the preparation of master powder and uniform blending cannot thus be achieved, so that defective molding may occur and the resulting molded article may not have stable physical properties.

As solutions to such problems, for example, Patent Document 1 proposes an additive composition obtained by mixing a benzylidene sorbitol compound with a submicron-sized silica compound. Patent Document 2 proposes a clarifying agent composition which is a mixture of a dibenzylidene sorbitol compound having a volume particle size, D97, of 30 μm to 200 μm and tetrakis[3(3,5-di-tert-butyl-4-hydroxyphenyl)propionyloxymethyl]methane. Further, Patent Document 3 proposes a crystal nucleating agent composition for polyolefin-based resins, which comprises 1,3:2,4-bis(3',4'-dimethylbenzylidene)sorbitol, a metal phosphate and a compound that is a monovalent metal salt of fatty acid optionally substituted with a hydroxy group.

RELATED ART DOCUMENTS

Patent Documents

Patent Document 1: Japanese Unexamined Patent Application Publication (Translation of PCT Application) No. 2009-507982
Patent Document 2: Japanese Unexamined Patent Application Publication No. 2011-207991
Patent Document 3: Japanese Unexamined Patent Application Publication No. 2010-84095

SUMMARY OF THE INVENTION

Problems to be Solved by the Invention

However, these compositions disclosed in Patent Documents 1 to 3 do not have a satisfactory fluidity for practical use; therefore, a further improvement has been desired. Moreover, in the clarifying agent composition disclosed in Patent Document 2, although the fluidity is improved when a benzylidene sorbitol compound having a large particle size is used, since the dispersibility in a resin is reduced due to an increased particle size, there is a problem of reduction in the effects as a clarifying agent. Furthermore, none of these Patent Documents describes a method of heat-treating an additive composition.

In view of the above, objects of the present invention are to solve the above-described problems in the prior art and to provide: a clarifying agent composition in a powder form which has excellent fluidity; and a polyolefin-based resin composition capable of yielding a molded article having excellent clarity.

Means for Solving the Problems

The present inventors intensively studied to solve the above-described problems and discovered that the above-described objects can be achieved by heat-blending a specific benzylidene sorbitol compound, tetrakis[3(3,5-di-tert-butyl-4-hydroxyphenyl)propionyloxymethyl]methane, which is a phenolic antioxidant, and a lubricant at a specific ratio, thereby completing the present invention.

That is, the clarifying agent composition of the present invention is obtained by heating a mixture in a range of 80 to 180° C., the mixture comprising: not less than 85% by mass of a benzylidene sorbitol compound represented by the following Formula (1):

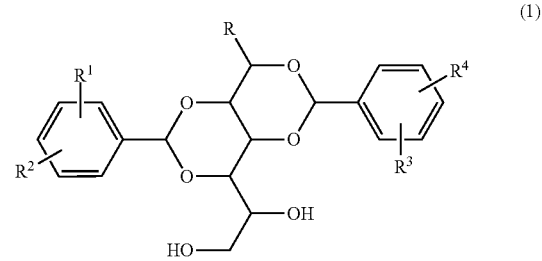

(wherein, R represents a hydrogen atom or an alkyl group having 1 to 4 carbon atoms; and $R^1$, $R^2$, $R^3$ and $R^4$ each independently represent a hydrogen atom, a halogen atom, a cyano group or an alkyl group having 1 to 4 carbon atoms); 5 to 10% by mass of tetrakis[3(3,5-di-tert-butyl-4-hydroxyphenyl)propionyloxymethyl]methane; and 6 to 9% by mass of a lubricant.

It is preferred that the clarifying agent composition of the present invention have a bulk specific gravity of not less than 0.18 g/ml. Further, in the clarifying agent composition of the present invention, it is preferred that all of the $R^1$ to $R^4$ in the Formula (1) be methyl groups.

In the clarifying agent composition of the present invention, it is preferred that the lubricant be glycerin monostearate.

The polyolefin-based resin composition of the present invention comprises any of the above-described clarifying agent compositions in an amount of 0.01 to 1 part by mass with respect to 100 parts by mass of a polyolefin-based resin.

The method of producing a clarifying agent composition according to the present invention comprises the step of heating a mixture in a range of 80 to 180° C. with stirring using a stirrer having a stirring blade structure, the mixture comprising: not less than 85% by mass of a benzylidene sorbitol compound represented by the following Formula (1):

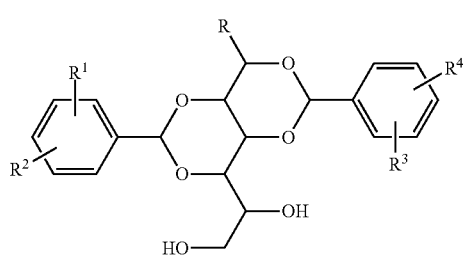

(wherein, R represents a hydrogen atom or an alkyl group having 1 to 4 carbon atoms; and $R^1$, $R^2$, $R^3$ and $R^4$ each independently represent a hydrogen atom, a halogen atom, a cyano group or an alkyl group having 1 to 4 carbon atoms);
5 to 10% by mass of tetrakis[3(3,5-di-tert-butyl-4-hydroxyphenyl)propionyloxymethyl]methane; and 6 to 9% by mass of a lubricant.

In the method of producing a clarifying agent composition according to the present invention, it is preferred that all of the $R^1$ to $R^4$ in the Formula (1) be methyl groups.

In the method of producing a clarifying agent composition according to the present invention, it is preferred that the lubricant be glycerin monostearate.

Effects of the Invention

The clarifying agent composition of the present invention has good fluidity and a molded article obtained by molding a polyolefin-based resin composition comprising the clarifying agent composition has excellent clarity.

MODE FOR CARRYING OUT THE INVENTION

The clarifying agent composition of the present invention will now be described in detail.

The clarifying agent composition of the present invention comprises: a benzylidene sorbitol compound represented by the Formula (1):

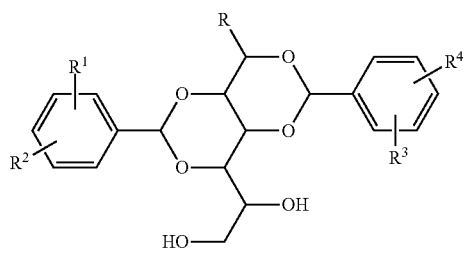

(wherein, R represents a hydrogen atom or an alkyl group having 1 to 4 carbon atoms; and $R^1$, $R^2$, $R^3$ and $R^4$ each independently represent a hydrogen atom, a halogen atom, a cyano group or an alkyl group having 1 to 4 carbon atoms); tetrakis[3(3,5-di-tert-butyl-4-hydroxyphenyl)propionyloxymethyl]methane; and a lubricant.

In the clarifying agent composition of the present invention, the content of the benzylidene sorbitol compound represented by the Formula (1) is not less than 85% by mass; the content of tetrakis[3(3,5-di-tert-butyl-4-hydroxyphenyl)propionyloxymethyl]methane is 5 to 10% by mass; and the content of the lubricant is 6 to 9% by mass. When the content of the benzylidene sorbitol compound represented by the Formula (1) in the clarifying agent composition is less than 85% by mass, sufficient clarity may not be imparted to a polyolefin-based resin.

In the clarifying agent composition of the present invention, when the content of tetrakis[3(3,5-di-tert-butyl-4-hydroxyphenyl)propionyloxymethyl]methane is less than 5% by mass, the resulting clarifying agent composition may not be able to attain a required bulk specific gravity, while when the content is greater than 10% by mass, coloration may occur in a molded article obtained by molding a polyolefin-based resin in which the clarifying agent composition is incorporated.

In the clarifying agent composition of the present invention, when the content of the lubricant is less than 6% by mass, the resulting clarifying agent composition may not be able to attain a required bulk specific gravity, while when the content is greater than 9% by mass, sufficient clarity-improving effect may not be obtained.

It is preferred that the clarifying agent composition of the present invention be a powder-form composition which has good ease of handling and a bulk specific gravity of not less than 0.18 g/ml, and the clarifying agent composition can be uniformly blended with a polyolefin-based resin.

The term "bulk specific gravity" used in the present invention refers to an apparent density determined in accordance with JIS K5101-12-1 (2004), and the bulk specific gravity of a sample is measured by adding the sample to a receptacle through a funnel arranged above the receptacle until the sample is piled up without applying vibration to the receptacle to be filled and then measuring the apparent density of the sample filled in the receptacle in a condition where the mound portion has been removed using a spatula.

Examples of the alkyl group having 1 to 4 carbon atoms which is represented by R, $R^1$, $R^2$, $R^3$ and $R^4$ in the Formula (1) include a methyl group, an ethyl group, a propyl group, an isopropyl group, a butyl group, a sec-butyl group, a tert-butyl group and an isobutyl group.

Examples of the halogen atom represented by $R^1$, $R^2$, $R^3$ and $R^4$ in the Formula (1) include fluorine, chlorine, bromine and iodine.

Examples of specific structure of the benzylidene sorbitol compound represented by the Formula (1) include those of the following compounds. However, the present invention is not restricted thereto by any means.

S-1

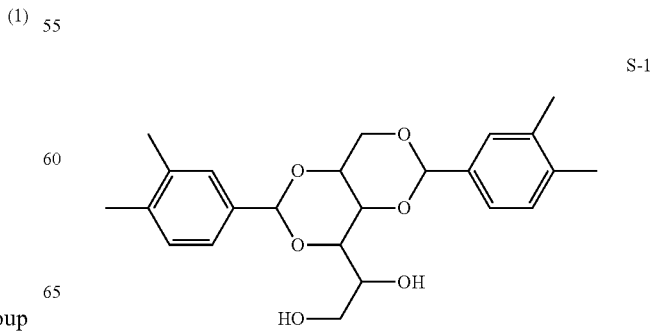

S-2
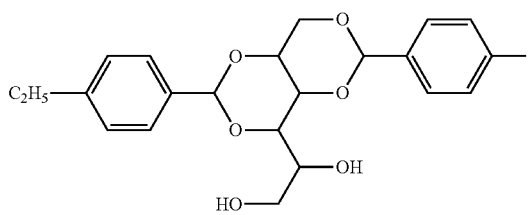

S-3
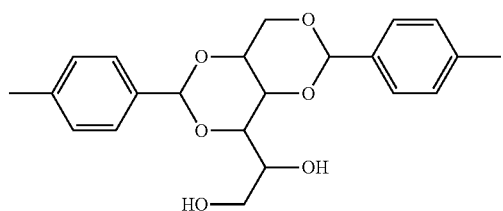

S-4
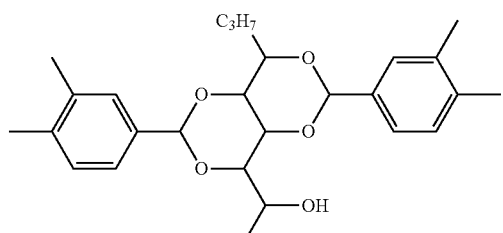

S-5
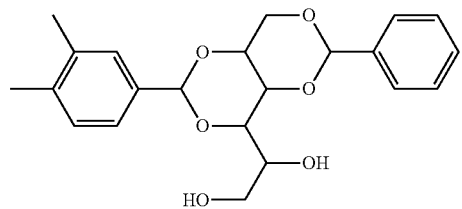

S-6
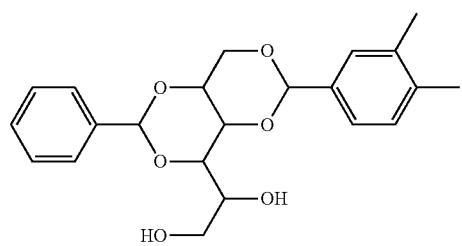

S-7
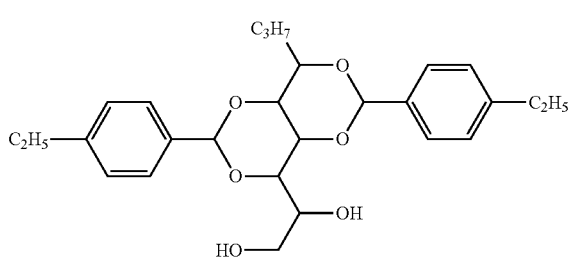

S-8
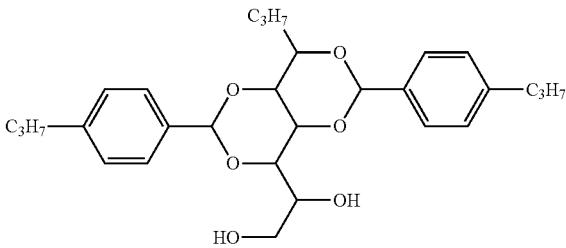

Examples of the lubricant used in the present invention include unsaturated fatty acid amides such as oleic acid amide and erucic acid amide; saturated fatty acid amides such as behenic acid amide and stearic acid amide; glycerin-based ester compounds such as glycerin esters and diglycerin esters; polyalkylene glycols such as polyethylene glycols and polypropylene glycols; compounds in which an acyl group is bound to a hydroxyl group of a polyalkylene glycol; and silicone oils.

Examples of specific structures of the glycerin esters include those of glycerin diacetate stearate, glycerin diacetate palmitate, glycerin diacetate mystirate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate mystirate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, and glycerin oleate propionate. These glycerin esters may be used individually, or two or more thereof may be used in combination.

Examples of specific structures of the diglycerin esters include those of fatty acid esters of diglycerin and mixed acid esters of diglycerin, such as diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramystirate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate mystirate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate, diglycerin diacetate dimystirate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimystirate, diglycerin acetate tripalmitate, diglycerin acetate tristearate, diglycerin acetate trioleate, diglycerin laurate, diglycerin stearate, diglycerin caprylate, diglycerin myristate and diglycerin oleate. These diglycerin esters may be used individually, or two or more thereof may be used in combination.

Examples of specific structures of the polyalkylene glycols include those of polyethylene glycols and polypropylene glycols that have an average molecular weight of 200 to 1,000, and these polyalkylene glycols may be used individually, or two or more thereof may be used in combination.

Examples of specific structures of the compounds in which an acyl group is bound to a hydroxyl group of a polyalkylene glycol include those of polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristylate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristylate, polyoxypropylene palmitate, polyoxypropylene stearate, polyoxypropylene oleate and polyoxypropylene linoleate. These compounds may be used individually, or two or more thereof may be used in combination.

In the present invention, the lubricant is preferably monoacylglycerol, more preferably glycerin monostearate, because these lubricants enable to easily improve the bulk specific gravity of the clarifying agent composition.

It is preferred that the clarifying agent composition of the present invention have a bulk specific gravity of not less than 0.18 g/ml. In cases where the bulk specific gravity is less than 0.18 g/ml, when a polyolefin-based resin is blended with the clarifying agent composition, layer separation occurs between the polyolefin-based resin and the clarifying agent composition and uniform blending cannot thus be achieved, so that defective molding may occur and the resulting molded article may not have stable physical properties.

The method of producing the clarifying agent composition of the present invention is not restricted as long as the clarifying agent composition is obtained by adding 5 to 10 parts by mass of tetrakis[3(3,5-di-tert-butyl-4-hydroxyphenyl)propionyloxymethyl]methane and 6 to 9 parts by mass of the lubricant to 100 parts by mass of the benzylidene sorbitol compound represented by the Formula (1) and heat-blending the resulting mixture in a range of 80 to 180° C. and the clarifying agent composition of the present invention can be produced by a conventionally known method. For example, the benzylidene sorbitol compound represented by the Formula (1), tetrakis[3(3,5-di-tert-butyl-4-hydroxyphenyl)propionyloxymethyl]methane and the lubricant can be added and then blended with heating using a stirrer having a temperature-controlling function, or they can be mixed first using a mill roll, Banbury mixer, super mixer, Henschel mixer or the like and then kneaded using a processing machine such as a uniaxial or biaxial extruder.

In the clarifying agent composition of the present invention, it is preferred that the heat-treated clarifying agent composition be passed through a 30 mesh (mesh size: 500 μm). Without being passed through a 30 mesh, when the clarifying agent composition is added to a polyolefin-based resin and the resultant is molded, the resulting molded article may not have sufficient clarity and the outer appearance thereof may be impaired due to generation of foreign matter.

The clarifying agent composition of the present invention may further contain other additive(s) in addition to the above-described mixture. In cases where other additive is incorporated, it is required that the clarifying agent composition contain the benzylidene sorbitol compound represented by the Formula (1) in an amount of not less than 85% by mass. When the content of the benzylidene sorbitol compound is less than 85% by mass, sufficient clarity may not be imparted to a polyolefin-based resin.

Examples of the above-described other additives include a phenolic antioxidant, a phosphorus-based antioxidant, a thioether-based antioxidant, an ultraviolet absorber, a hindered amine compound, a flame retardant, a nucleating agent, a filler, an antistatic agent, a heavy metal inactivator, a metallic soap, a hydrotalcite, a pigment, a dye, a plasticizer, an anti-blocking agent, and a mineral oil.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-ter-butyl-4-hydroxyphenyl)propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N'-hexane-1,6-diylbis[3-(3,5-di-tert-butyl-4-hydroxyphenyl)propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), 3,5-bis(1,1-dimethylethyl)-4-hydroxybenzenepropanoate. CI 3-15 alkyl esters, 2,5-di-tert-amylhydroquinone, hindered phenol polymer (AO.OH998 (trade name), manufactured by ADEKA Palmarole), 2,2'-methylene-bis[6-(1-methylcyclohexyl) p-cresol], 2-tert-butyl-6-(3-ter-butyl-2-hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 6-(3-(3-tert-butyl-4-hydroxy-5-methyl)propoxy 1-2,4,8,10-tetra-tert-butylbenzo[d,f][1,3,2]-dioxaphosphepin, hexamethylene-bis[3-(3,5-di-ter-butyl-4-hydroxyphenyl)propionate, calcium bis[monoethyl(3,5-di-tert-butyl-4-hydroxybenzyl) phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxy benzyl)phosphonate, tridecyl-3,5-di-tert-butyl-4-hydroxybenzyl thioacetate, thiodiethylene-bis [(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis(3,3-bis(4-hydroxy-3-tert-butylphenyl)butyric acid]glycol ester, 4,4'-butylidene-bis(2,6-di-ter-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5- di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, and triethylene glycol-bis[β-(3-tert-butyl-4-hydroxy-5-methylphenyl)propionate]. These phenolic antioxidants may be used individually, or two or more thereof may be used in combination.

Examples of the phosphorus-based antioxidant include diisooctyl phosphite, heptakis triphosphite, triisodecyl phosphite, diphenyl phosphite, diphenyl isooctyl phosphite, diisooctylphenyl phosphite, diphenyl tridecyl phosphite, triisooctyl phosphite, trilauryl phosphite, tris(dipropylene glycol)phosphite, diisodecyl pentaerythritol diphosphite, dioleyl hydrogen phosphite, trilauryl trithiophosphite, bis(tridecyl)phosphite, tris(isodecyl)phosphite, tris(tridecyl)phosphite, diphenyldecyl phosphite, dinonylphenyl-bis(nonylphenyl)phosphite, poly(dipropylene glycol)phenyl phosphite, tetraphenyldipropyl glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-tert-butyl-6-methylphenyl)ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene)-tris(2-1,1-dimethylethyl)-5-methyl-4,1-phenylene) hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl) phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-tert-butylphenyl-2-butyl-2-ethyl-1,3-propanediol phosphite, poly-4,4'-isopropylidene diphenol C12-15 alcohol phosphite, and phosphite of 2-ethyl-2-butylpropylene glycol and 2,4,6-tri-tert-butylphenol. These phosphorus-based antioxidants may be used individually, or two or more thereof may be used in combination.

Examples of the thioether-based antioxidant include tetrakis[methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol) and distearyl disulfide. These thioether-based antioxidants may be used individually, or two or more thereof may be used in combination.

Examples of the ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol ester of 2-(2-hydroxy-3-tert-butyl-5-carboxyphenyl)benzotriazole 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl (3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and various metal salts and metal chelates, particularly salts and chelates of nickel and chromium. These ultraviolet absorbers may be used individually, or two or more thereof may be used in combination.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl)

malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-1-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8-12-tetraazadodecane, 1,6,11-tris[2,4-bis(N-butyl-N-(2,2,6,6-tetramethyl-4-piperidyl)amino)-s-triazine-6-yl]aminoun decane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl)piperidyl}decanedionate and bis{4-(2,2,6,6-tetramethyl-1-undecyloxy)piperidyl}carbonate. These hindered amine compounds may be used individually or two or more thereof may be used in combination.

Examples of the flame retardant include aromatic phosphates such as triphenyl phosphate, tricresyl phosphate, trixylenyl phosphate, cresyldiphenyl phosphate, cresyl-2,6-xylenyl phosphate, resorcinol-bis(diphenylphosphate). (1-methylethylidene)di-4,1-phenylenetetraphenyl diphosphate, 1,3-phenylene-tetrakis(2,6-dimethylphenyl)phosphate, ADK STAB FP-500 (manufactured by ADEKA Corporation), ADK STAB FP-600 (manufactured by ADEKA Corporation) and ADK STAB FP-800 (manufactured by ADEKA Corporation); phosphonates such as divinyl phenylphosphonate, diallyl phenylphosphonate and (1-butenyl) phenylphosphonate; phosphinates such as phenyl diphenylphosphinate, methyl diphenylphosphinate and 9,10-dihydro-9-oxa-10-phosphaphenanthrene-10-oxide derivatives; phosphazene compounds such as bis(2-allylphenoxy)phosphazene and dicresylphosphazene; phosphorus-based flame retardants such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromphenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene. These flame retardants are preferably used in combination with a drip inhibitor such as a fluorocarbon resin and/or a flame retardant aid such as a polyhydric alcohol or hydrotalcite. These flame retardants may be used individually, or two or more thereof may be used in combination.

Examples of the nucleating agent include metal carboxylates such as sodium benzoate, aluminum-4-tert-butylbenzoate, sodium adipate and 2-sodium-bicyclo[2.2.1]heptane-2,3-dicarboxylate; metal phosphates such as sodium-bis(4-tert-butylphenyl)phosphate, sodium-2,2'-methylenebis(4,6-di-tert-butylphenyl)phosphate and lithium-2,2'-methylenebis(4,6-di-tert-butylphenyl)phosphate; polyhydric alcohol derivatives such as dibenzylidene sorbitol, bis(m-ethylbenzylidene)sorbitol, bis(3,4-dimethylbenzylidene)sorbitol, bis(p-ethylbenzylidene)sorbitol and bis(dimethylbenzylidene)sorbitol; and amide compounds such as N,N',N''-tris[2-methylcyclohexyl]-1,2,3-propane tricarboxamide, N,N',N''-tricyclohexyl-1,3,5-benzene tricarboxamide, N,N'-dicyclohexyl-naphthalene dicarboxamide and 1,3,5-tri(dimethylisopropoylamino)benzene. These nucleating agents may be used individually, or two or more thereof may be used in combination.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, silica, alumina, potassium titanate whiskers, wollastonite and fibrous magnesium oxysulfate. Among these fillers, those having an average particle size (in the case of spherical or plate-form fillers) or an average fiber diameter (in the case of needle-form or fibrous fillers) of 5 μm or less are preferred.

The above-described antistatic agent is added for the purposes of reducing the electrostaticity of the resulting molded article and inhibiting dust adhesion caused by electrostatic charge. Examples of such antistatic agent include cationic, anionic and non-ionic antistatic agents. Preferred examples thereof include polyoxyethylene alkylamines, polyoxyethylene alkylamides, fatty acid esters thereof, and glycerin fatty acid esters.

The amount of such other additives to be used in the present invention is preferably in the range of from an amount at which the effect of the addition is exerted to an amount at which an improvement in the effect of the addition is no longer observed. Preferred amounts of the respective additives to be used with respect to 100 parts by mass of a polyolefin-based resin are as follows: 0.1 to 20 parts by mass of a plasticizer(s), 1 to 50 parts by mass of a filler(s), 0.001 to 1 part by mass of a surface treatment agent(s), 0.001 to 10 parts by mass of a phenolic antioxidant(s), 0.001 to 10 parts by mass of a phosphorus-based antioxidant(s), 0.001 to 10 parts by mass of a thioether-based antioxidant(s), 0.001 to 5 parts by mass of a ultraviolet absorber(s), 0.01 to 1 part by mass of a hindered amine compound(s), 1 to 50 parts by mass of a flame retardant(s), and 0.03 to 2 parts by mass of an antistatic agent(s). These additives may be used individually, or two or more thereof may be used in combination.

The polyolefin-based resin composition of the present invention will now be described in detail.

Examples of the polyolefin-based resin include α-olefin polymers such as low-density polyethylenes, linear low-density polyethylenes, high-density polyethylenes, isotactic polypropylenes, syndiotactic polypropylenes, hemi-isotactic polypropylenes, cycloolefin polymers, stereo block polypropylenes, poly-3-methyl-1-butene, poly-3-methyl-1-pentene and poly-4-methyl-1-pentene; and α-olefin copolymers such as ethylene/propylene block or random copolymers.

As for the method of producing the polyolefin-based resin, in a variety of polymerization methods such as vapor-phase polymerization, solution polymerization, emulsion polymerization and bulk polymerization that encompass various polymerization catalysts such as Ziegler catalyst, Ziegler-Natta catalysts and metallocene catalysts as well as co-catalysts, catalyst carriers and chain transfer agents, the polyolefin-based resin is produced by appropriately selecting polymerization conditions, such as temperature, pressure, concentration, flow rate and removal of catalyst residue, that yield a resin having physical properties suitable for a packaging material or a resin having physical properties suitable for molding of a packaging material. The properties of the polyolefin-based resins, such as number-average molecular weight, weight-average molecular weight, molecular weight distribution, melt flow rate, melting point, melting peak temperature, stereoregularity (e.g., isotacticity or syndiotacticity), presence/absence and degree of branching, specific gravity, ratio of a component(s) dissolving in various solvents, haze, gloss, impact strength, bending modulus of elasticity and Olsen rigidity, as well as whether or not the respective physical property values satisfy a specific formula, can be appropriately selected in accordance with the desired properties.

The polyolefin-based resin composition of the present invention comprises the clarifying agent composition of the present invention in an amount of 0.01 to 1 part by mass, preferably 0.03 to 0.7 parts by mass, more preferably 0.1 to 0.5 parts by mass, with respect to 100 parts by mass of the polyolefin-based resin. When the content of the clarifying agent composition of the present invention is less than 0.01 parts by mass, the effect of the addition may not be sufficient, while when the content of the clarifying agent composition of the present invention is greater than 1 part by mass, the clarifying agent composition may bleed out to the surface of a molded article obtained by molding the polyolefin-based resin composition.

Further, in the polyolefin-based resin composition of the present invention, as required, a commonly used and conventionally known other additive(s) may also be incorporated separately from the clarifying agent composition of the present invention, as long as the amount thereof is within a range that does not impair the effects of the present invention. Examples of other additives include the same ones as those exemplified above. Moreover, a lubricant different from the one used in the clarifying agent composition of the present invention may also be incorporated. When such a lubricant is incorporated, the amount thereof is preferably 0.03 to 2 parts by mass with respect to 100 parts by mass of the polyolefin-based resin.

In the polyolefin-based resin composition of the present invention, the method of incorporating the clarifying agent composition of the present invention into the polyolefin-based resin is not particularly restricted, and a conventionally known method can be employed. For example, the polyolefin-based resin in a powder or pellet form may be mixed with the clarifying agent composition by dry blending, or the clarifying agent composition is partially pre-blended and then dry-blended along with remaining components. After the dry blending, for example, the resultant may be mixed using a mill roll, a Banbury mixer, a super mixer or the like and kneaded using a uniaxial or biaxial extruder or the like. The mixing and kneading are usually performed at a temperature of about 120 to 220° C. For example, a method in which the clarifying agent composition is added in the stage of polymerizing the polyolefin-based resin; a method in which, after mixing the clarifying agent composition in advance with, for example, a granulation aid such as a binder, a wax, a solvent or silica at a desired ratio, the resulting mixture is granulated to prepare a one-pack composite additive and this one-pack composite additive is added to the polyolefin-based resin; or a method in which a masterbatch containing the clarifying agent composition at a high concentration is prepared and then added to the polyolefin-based resin, can be employed.

For molding of the polyolefin-based resin composition of the present invention, a known molding method such as extrusion molding, injection molding, blow molding, vacuum molding or compression molding can be employed in the same manner as in common plastics, and a variety of molded articles such as sheets, rods, bottles and containers can be easily obtained. Further, the polyolefin-based resin composition of the present invention may also be blended with glass fibers, carbon fibers or the like to produce fiber-reinforced plastics.

EXAMPLES

The present invention will now be described more concretely by way of examples thereof; however, the present invention is not restricted to the following examples and the like by any means.

After heating a Henschel mixer (FM200; manufactured by Mitsui Mining Co., Ltd.) to a prescribed temperature in advance, each clarifying agent composition having the formulation shown in Table 1 or 2 was loaded thereto and stirred for 15 minutes at a rotation speed of 500 rpm. An indication of "none" for heat treatment in the Tables means that the clarifying agent composition was stirred for 15 minutes at a rotation speed of 500 rpm at room temperature without heating. The resulting clarifying agent compositions were each subjected to the below-described evaluations. The evaluation results are shown in Tables 1 and 2 below. It is noted here that "S-1" in the Tables corresponds to the above-exemplified benzylidene sorbitol compound.

(500 μm Mesh-Pass)

The thus obtained clarifying agent compositions were each allowed to pass through a 30-mesh sieve having a mesh size of 500 μm. The weight of the clarifying agent composition that passed through the sieve was measured and the ratio (%) of the clarifying agent composition that passed through the sieve with respect to the whole clarifying agent composition was calculated. The results thereof are shown in Tables 1 and 2 below.

(Bulk Specific Gravity)

The bulk specific gravity was measured in accordance with JIS K5101-12 (2004). The results thereof are shown in Tables 1 and 2 below.

(Mixing Test with PP)

To a 20-L Henschel mixer (FM200; manufactured by Mitsui Mining Co., Ltd.), 100 parts by mass of a polypropylene resin and 150 g of the thus obtained clarifying agent composition were loaded, and they were stirred for 1 minute at room temperature and a rotation speed of 500 rpm. Thereafter, when adhesion of the clarifying agent composition to the side wall of the stirring chamber of the Henschel mixer at a position above the surface of the content in the stirring chamber was observed, an evaluation "x" was given, while an evaluation "○" was given when such adhesion of the clarifying agent composition was not observed. The results thereof are shown in Tables 1 and 2 below. Here, when adhesion of the clarifying agent composition to the side wall of the stirring chamber was not observed, it indicates that the clarifying agent composition had good fluidity.

(Haze and Outer Appearance)

Using a Henschel mixer (FM200; manufactured by Mitsui Mining Co., Ltd.), 100 parts by mass of a polyolefin-based resin (ethylene-propylene random copolymer; melt flow rate=8 g/10 min) was mixed with 0.026 parts by mass of di(t-butylperoxy)diisopropylbenzene as a peroxide, 0.1 parts by mass of tetrakis[methylene-3-(3',5'-di-tert-butyl-4'-hydroxyphenyl)propionate]methane as a phenolic antioxidant, 0.1 parts by mass of tris(2,4-di-tert-butylphenyl)phosphite as a phosphorus-based antioxidant, 0.05 parts by mass of calcium stearate and 0.2 parts by mass of the respective clarifying agent composition shown in Table 1 below, at 1,000 rpm for 1 minute. Then, using a biaxial extruder (PCM-30; manufactured by Ikegai Corp.), the resulting mixture was extruded under processing conditions of a temperature of 240° C. and a screw speed of 160 rpm to produce a pellet. The peroxide was added for the purpose of adjusting the melt flow rate of the polyolefin-based resin. The thus obtained pellets all had a melt flow rate of 42 g/10 min. Using an injection molding machine (EC100-2A; manufactured by Toshiba Machine Co., Ltd.), the thus obtained pellets were each filled into a die for 40 seconds under an injection temperature of 200° C. and an injection pressure of 70 to 80 MPa and subsequently cooled for 20 seconds in the die at 40° C. The resultant was then injection-molded under conditions for drawing a sheet from the die, thereby obtaining a 1 mm-thick square sheet of 60 mm×60 mm in size. Immediately thereafter, this sheet was left to stand in an incubator having an inner temperature of 23° C. for at least 48 hours, and the haze of the test piece was determined using Haze Guard II (manufactured by Toyo Seiki Seisaku-sho, Ltd.). A lower haze value indicates superior clarity of the test piece. Using the haze value of the sheet of Comparative Example 1 as a reference, an evaluation "∘" was given when the difference in haze was 0.3 or less, while an evaluation "x" was given when the difference in haze was greater than 0.3. An evaluation "x" was also given when a foreign matter was observed in the sheet and the sheet thus had a poor outer appearance. The results thereof are shown in Tables 1 and 2 below.

According to the results of Comparative Example 2 shown in Table 1, the clarifying agent composition containing 20% by mass of tetrakis[3(3,5-di-tert-butyl-4-hydroxyphenyl)propionyloxymethyl]methane had an improved fluidity; however, the particle size of the clarifying agent composition was increased and the sheet had a reduced clarity. According to the results of Comparative Example 7 shown in Table 2, the clarifying agent composition containing 10% by mass of the lubricant had an improved fluidity; however, the sheet had a reduced clarity and showed coloration. According to the results of Comparative Example 8 shown in Table 2, even with the formulation of the clarifying agent composition of the present invention, the fluidity of the clarifying agent composition was not improved at all when the materials were not heat-blended. Further, according to Comparative Example 9, when the amount of the lubricant was less than 6% by mass, the effect of improving the fluidity of the clarifying agent composition was poor and, according to Comparative Example 10, the sheet had a reduced clarity when the amount of the lubricant was greater than 9% by mass.

On the other hand, from the results of Examples 1 and 2 shown in Table 1, it was confirmed that the clarifying agent compositions of the present invention attained an improved fluidity of the clarifying agent composition without impairing the clarity of the respective sheets.

The invention claimed is:

1. A clarifying agent composition obtained by heating a mixture in a range of 80 to 180° C., said mixture comprising:

not less than 85% by mass of a benzylidene sorbitol compound represented by the following Formula (1):

TABLE 1

| | | Example 1 | Example 2 | Comparative Example 1 | Comparative Example 2 | Comparative Example 3 | Comparative Example 4 | Comparative Example 5 |
|---|---|---|---|---|---|---|---|---|
| Formulation | S-1 | 89 | 85 | 100 | 80 | 90 | 94.6 | 95 |
| | AO-60 | 5 | 9 | — | 20 | 10 | 5.4 | 5 |
| | GMS | 6 | 6 | — | — | — | — | — |
| | Heat treatment | 120° C. | 120° C. | none | 120° C. | 120° C. | none | 120° C. |
| Evaluation | 500 μm mesh-pass | >99 | >99 | >99 | <40 | >99 | >99 | >99 |
| | Bulk specific gravity [g/ml] | 0.22 | 0.25 | 0.07 | 0.3 | 0.14 | 0.10 | 0.12 |
| | Mixing test with PP | ∘ | ∘ | x | ∘ | x | x | x |
| | Haze, Outer appearance | ∘ | ∘ | ∘ | x | ∘ | ∘ | ∘ |

AO-60: trade name, manufactured by ADEKA Corporation: ADK STAB AO-60; tetrakis[3(3,5-di-tert-butyl-4-hydroxyphenyl)propionyloxymethyl]methane
GMS: glycerin monostearate

TABLE 2

| | | Comparative Example 6 | Comparative Example 7 | Comparative Example 8 | Comparative Example 9 | Comparative Example 10 | Comparative Example 11 |
|---|---|---|---|---|---|---|---|
| Formulation | S-1 | 94 | 90 | 89 | 90 | 85 | 89 |
| | AO-60 | — | — | 5 | 5 | 5 | 5 |
| | GMS | 6 | 10 | 6 | 5 | 10 | 6 |
| | Heat treatment | none | 120° C. | none | 120° C. | 120° C. | 70° C. |
| Evaluation | 500 μm mesh-pass | >99 | >99 | >99 | >99 | >99 | >99 |
| | Bulk specific gravity [g/ml] | 0.09 | 0.17 | 0.10 | 0.13 | 0.18 | 0.14 |
| | Mixing test with PP | x | ∘ | x | x | ∘ | x |
| | Haze, Outer appearance | ∘ | x | ∘ | ∘ | x | ∘ |

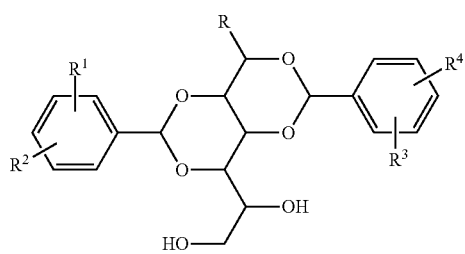

(1)

(wherein, R represents a hydrogen atom or an alkyl group having 1 to 4 carbon atoms; and $R^1$, $R^2$, $R^3$ and $R^4$ each independently represent a hydrogen atom, a halogen atom, a cyano group or an alkyl group having 1 to 4 carbon atoms);

5 to 9% by mass of tetrakis[3-(3,5-di-tert-butyl-4-hydroxyphenyl)propionyloxymethyl]methane; and 6 to 9% by mass of a lubricant.

2. The clarifying agent composition according to claim 1, having a bulk specific gravity of not less than 0.18 g/ml.

3. The clarifying agent composition according to claim 1, wherein all of said $R^1$ to $R^4$ in said Formula (1) are methyl groups.

4. The clarifying agent composition according to claim 1, wherein said lubricant is glycerin monostearate.

5. A method of producing a clarifying agent composition, said method comprising the step of heating a mixture in a range of 80 to 180° C. with stirring using a stirrer having a stirring blade structure, said mixture comprising:

not less than 85% by mass of a benzylidene sorbitol compound represented by the following Formula (1):

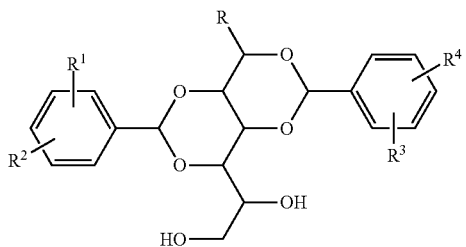

(1)

(wherein, R represents a hydrogen atom or an alkyl group having 1 to 4 carbon atoms; and $R^1$, $R^2$, $R^3$ and $R^4$ each independently represent a hydrogen atom, a halogen atom, a cyano group or an alkyl group having 1 to 4 carbon atoms);

5 to 9% by mass of tetrakis[3-(3,5-di-tert-butyl-4-hydroxyphenyl)propionyloxymethyl]methane; and 6 to 9% by mass of a lubricant.

6. The method of producing a clarifying agent composition according to claim 5, wherein all of said $R^1$ to $R^4$ in said Formula (1) are methyl groups.

7. The method of producing a clarifying agent composition according to claim 5, wherein said lubricant is glycerin monostearate.

* * * * *